United States Patent [19]
Drahusz, Jr.

[11] Patent Number: 6,067,893
[45] Date of Patent: May 30, 2000

[54] RIBBED DIAPHRAGM

[75] Inventor: George Drahusz, Jr., North Huntingdon, Pa.

[73] Assignee: Westinghouse Air Brake Company, Wilmerding, Pa.

[21] Appl. No.: 09/037,613

[22] Filed: Mar. 10, 1998

[51] Int. Cl.[7] .............................. F01B 19/04; F16J 3/02
[52] U.S. Cl. ................................................. 92/98 R; 92/96
[58] Field of Search ........................................ 92/96, 98 R

[56] References Cited

U.S. PATENT DOCUMENTS

| | | | |
|---|---|---|---|
| 2,545,857 | 3/1951 | Perkins et al. | 92/98 R |
| 3,212,446 | 10/1965 | Golden et al. | 92/98 R |
| 4,270,441 | 6/1981 | Tuck | 92/98 R |
| 5,220,863 | 6/1993 | Scott et al. | 92/98 R |
| 5,699,717 | 12/1997 | Reidlinger | 92/96 |

*Primary Examiner*—F. Daniel Lopez
*Attorney, Agent, or Firm*—James Ray & Associates

[57] ABSTRACT

The present invention provides a diaphragm having a generally truncated conical body for use in diaphragm actuating piston assemblies, such diaphragm comprising at least one layer of an elastomeric material selected from a group consisting of natural rubber, synthetic rubber, fabric reinforced rubber and mixtures thereof. There is further a first central opening, having a first predetermined diameter, disposed at a first edge of such diaphragm for mounting on a diaphragm actuating piston, such first central opening being formed by a bead like portion having a second predetermined diameter. There is further included a second central opening, having a third predetermined diameter, disposed at a second edge of such diaphragm for mounting on a body portion of such diaphragm actuating piston assembly, such second central opening being formed by a bead like portion having a fourth predetermined diameter. Such diaphragm has a generally flexure annular portion, connected at a first end to such bead-like portion at such first central opening and at a second end to such bead-like portion at such second central opening, incorporating a predetermined plurality of annular thick portions and annular thin portions of such elastomeric material, such annular thick portions alternating with such annular thin portions throughout a working length of such diaphragm.

19 Claims, 4 Drawing Sheets

RIBBED DIAPHRAGM

FIELD OF THE INVENTION

The present invention relates, in general, to flexible diaphragms subject to stress in pneumatic pressure devices and, more particularly, the present invention relates to an improved design for conical diaphragms used in diaphragm actuating piston assemblies of control valves used on railway freight cars.

BACKGROUND OF THE INVENTION

As is generally well known in the prior art, diaphragms are an integral part of pumps and other pneumatic pressure devices. It is necessary in these applications for these diaphragms to remain flexible in order for them to perform their function. However, the constant flexing of the diaphragm when the device is in use causes wear on the parts of the diaphragm that are in contact or attached to non flexing portions of the device.

These nonflexing parts may be the flange, follower and pump housing in the case of pump diaphragms or they could be body housing and piston housing in the case where diaphragms are used in some pneumatic valves. Regardless of its use or whatever is used to secure it, a diaphragm is subject to severe wear because portions of the diaphragm are secured and do not flex while other portions are constantly flexing when in use. It is the area of the diaphragm between the nonflexing portions, known as the "working length", that will exhibit wear and after a time may crack and/or have holes wear through the diaphragm.

When the diaphragm cracks and/or has holes worn through, the device of which the diaphragm is an integral part will be out of operation until a new diaphragm can be installed.

Diaphragms are generally made of an elastomeric material, such as rubber, and may be reinforced by having an inner layer of a fabric material molded between elastomer layers. The fabric layer imparts greater strength to the diaphragm without sacrificing flexibility and therefore permits a diaphragm to be subjected to higher pressures than if it were made solely of rubber, or another elastomer, of the same thickness. Rephrasing the previous sentence, the use of fabric reinforced rubber permits the use of thinner diaphragms which still have the ability to achieve results similar to those obtained through the use of thicker all rubber diaphragms. Thinner diaphragms are preferred for many reasons, including better responsiveness at low temperatures, provided they can still perform the desired function. However, problems have been encountered with fabric reinforced diaphragms in that it has been found that the fabric was not always centered in the diaphragm cross section. This has resulted in premature failure of the diaphragm.

Also in prior art, diaphragms used in diaphragm actuated pistons have employed either a uniform thickness or a gradual taper thickness in the flexing portion of the diaphragm. Stresses resulting from constant flexing have in many cases resulted in compression set wrinkles or kinks in the diaphragm at the flexure points. Such diaphragms have been a trade off in that the diaphragm had to be thick enough to avoid the kinking that can occur easily if the diaphragm is too thin and yet keep the diaphragm thin enough to avoid the creases or wrinkles which can occur in thicker diaphragms. Each of these problems can result in premature failure of the diaphragm.

In all cases, failure of a diaphragm results in "down time" for whatever device it is that uses such diaphragm coupled with the maintenance required to replace the diaphragm. Thus, any modification which can result in longer diaphragm life or improved diaphragm performance, which usually results in longer life, is a welcome improvement.

SUMMARY OF THE INVENTION

The present invention provides a diaphragm having a generally truncated conical body for use in diaphragm actuating piston assemblies, such diaphragm comprising at least one layer of an elastomeric material selected from a group consisting of natural rubber, synthetic rubber, fabric reinforced rubber and mixtures thereof. There is further a first central opening, having a first predetermined diameter, disposed at a first edge of such diaphragm for mounting on a diaphragm actuating piston, such first central opening being formed by a bead-like portion having a second predetermined diameter. There is further included a second central opening, having a third predetermined diameter, disposed at a second edge of such diaphragm for mounting on a body portion of such diaphragm actuating piston assembly, such second central opening being formed by a bead-like portion having a fourth predetermined diameter. A generally flexure annular portion is connected at a first end to such bead-like portion at such first central opening and at a second end to such bead-like portion at such second central opening. Such generally flexure annular portion incorporating a predetermined plurality of annular thick portions and annular thin portions of such elastomeric material, such annular thick portions alternating with such annular thin portions throughout a working length of such diaphragm.

OBJECTS OF THE INVENTION

It is, therefore, one of the primary objects of the present invention to provide an improved diaphragm for use in diaphragm-piston assemblies which will reduce fabric stress.

It is also an object of the present invention to provide an improved diaphragm for use in diaphragm-piston assemblies which will more readily maintain the centering of the fabric in the diaphragm's cross-section.

It is still an object of the present invention to provide an improved diaphragm for use in diaphragm-piston assemblies which will be more resistant to compression set wrinkles at flexure points.

Yet it is another object of the present invention to provide an improved diaphragm for use in diaphragm-piston assemblies which will improve manufacturability of such diaphragm.

Another object of the present invention is to provide an improved diaphragm for use in diaphragm-piston assemblies which will reduce fabric stress by reducing rubber velocity.

In addition to the objects and advantages of the present invention which have been described in detail above, various other objects and advantages will become readily apparent to those persons skilled in diaphragms and more particularly in diaphragm-piston assemblies from the following more detailed description of such invention particularly when such description is taken in conjunction with the attached drawing Figures and with the appended claims.

Figure 1:
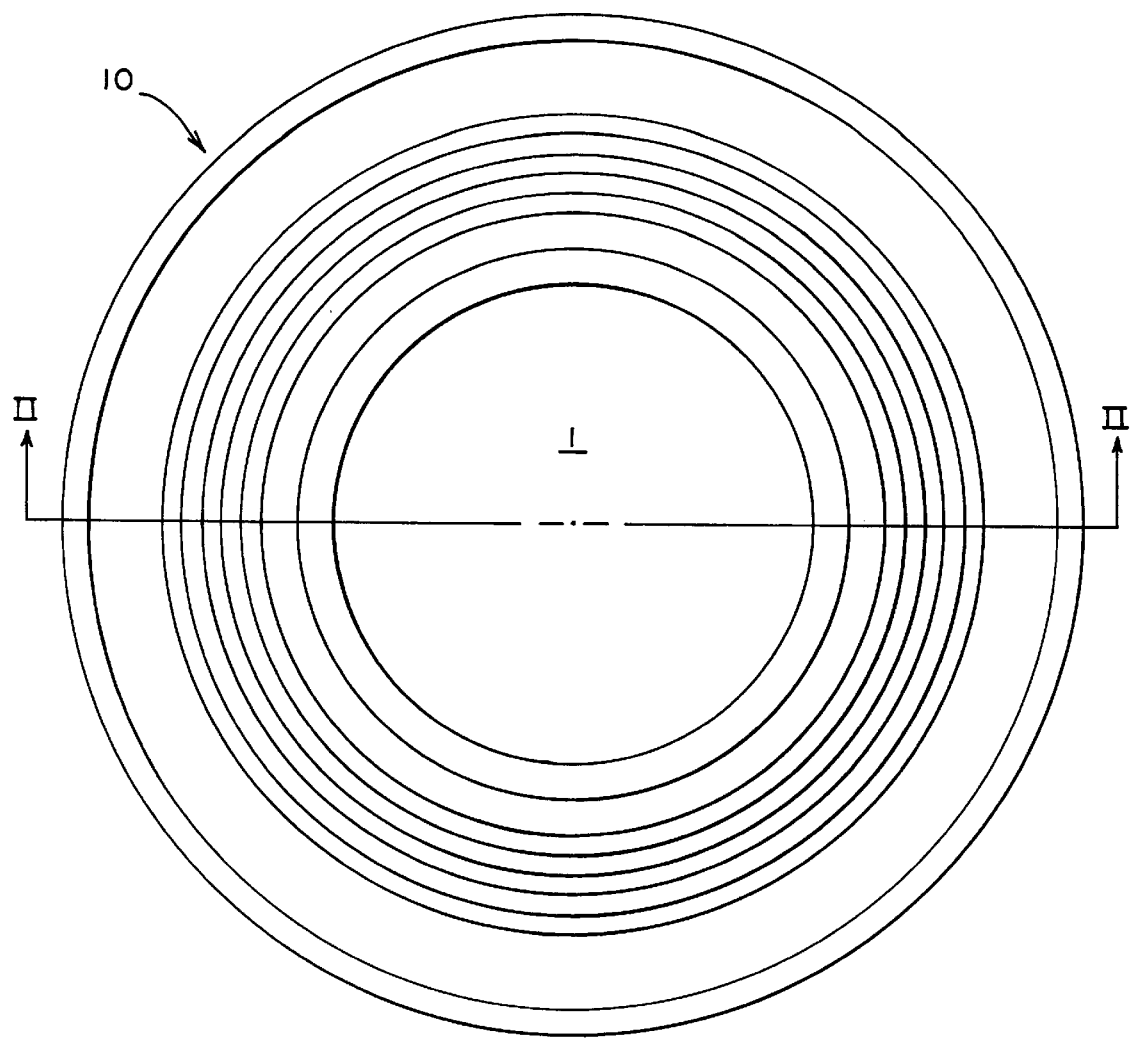
FIG. 1 is a plan view of a diaphragm used in diaphragm actuating piston assemblies.

BRIEF DESCRIPTION OF THE PRESENTLY PREFERRED AND VARIOUS ALTERNATE EMBODIMENTS OF THE INVENTION

Prior to proceeding to the more detailed description of the present invention, it should be noted that for the sake of clarity in understanding the invention, identical components with identical functions have been designated with identical reference numerals throughout the drawing Figures.

Figure 2:
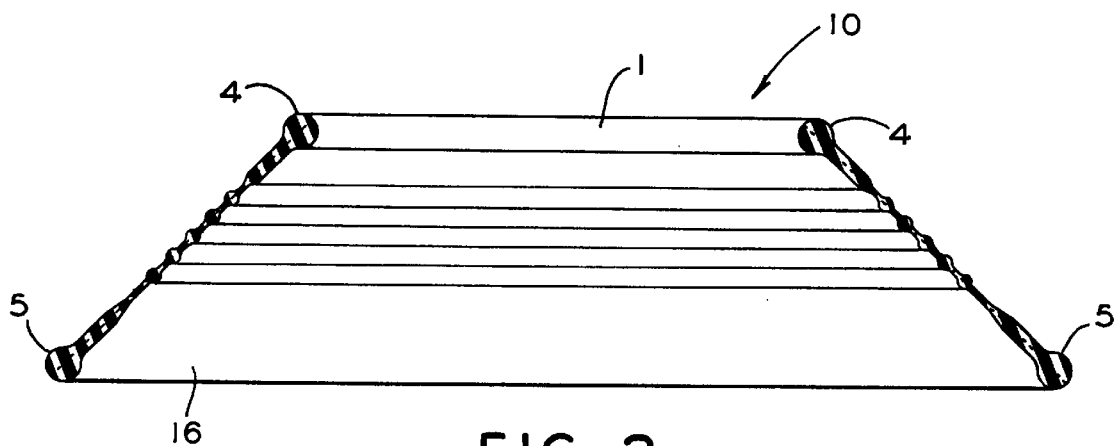
FIG. 2 is a cross-sectional view of a diaphragm used in diaphragm actuating piston assemblies taken across the lines of II—II of FIG. 1.

Reference is now made, more particularly, to FIGS. 1 and 2. Illustrated therein is a presently preferred embodiment of the diaphragm, which has been generally designated 10.

As can be seen in FIG. 2, diaphragm 10 has a first central opening 1, having a first predetermined diameter, for mounting on a diaphragm type actuating piston assembly (not shown in FIG. 2). Such first central opening being formed by a bead-like portion 4 having a second predetermined diameter. Such terminal bead-like portion 4 of such diaphragm 10 attaches to such piston housing and secures the diaphragm. Such diaphragm 10 further has a second central opening 16, having a third predetermined diameter, disposed at a second edge of such diaphragm 10 for mounting on a body portion of a diaphragm actuating piston assembly (not shown in FIG. 2). Such second central opening 16 being formed by a terminal bead-like portion 5 which is clamped to such body portion of a diaphragm actuating piston assembly. Such terminal bead-like portion 5 has a fourth predetermined diameter. Although the drawing shows the terminal bead-like portion 4 and the terminal bead like portion 5 as being essentially round, the ends may have a small square corner where the mold halves come together, however, this does not affect the invention in any way.

Figure 3:
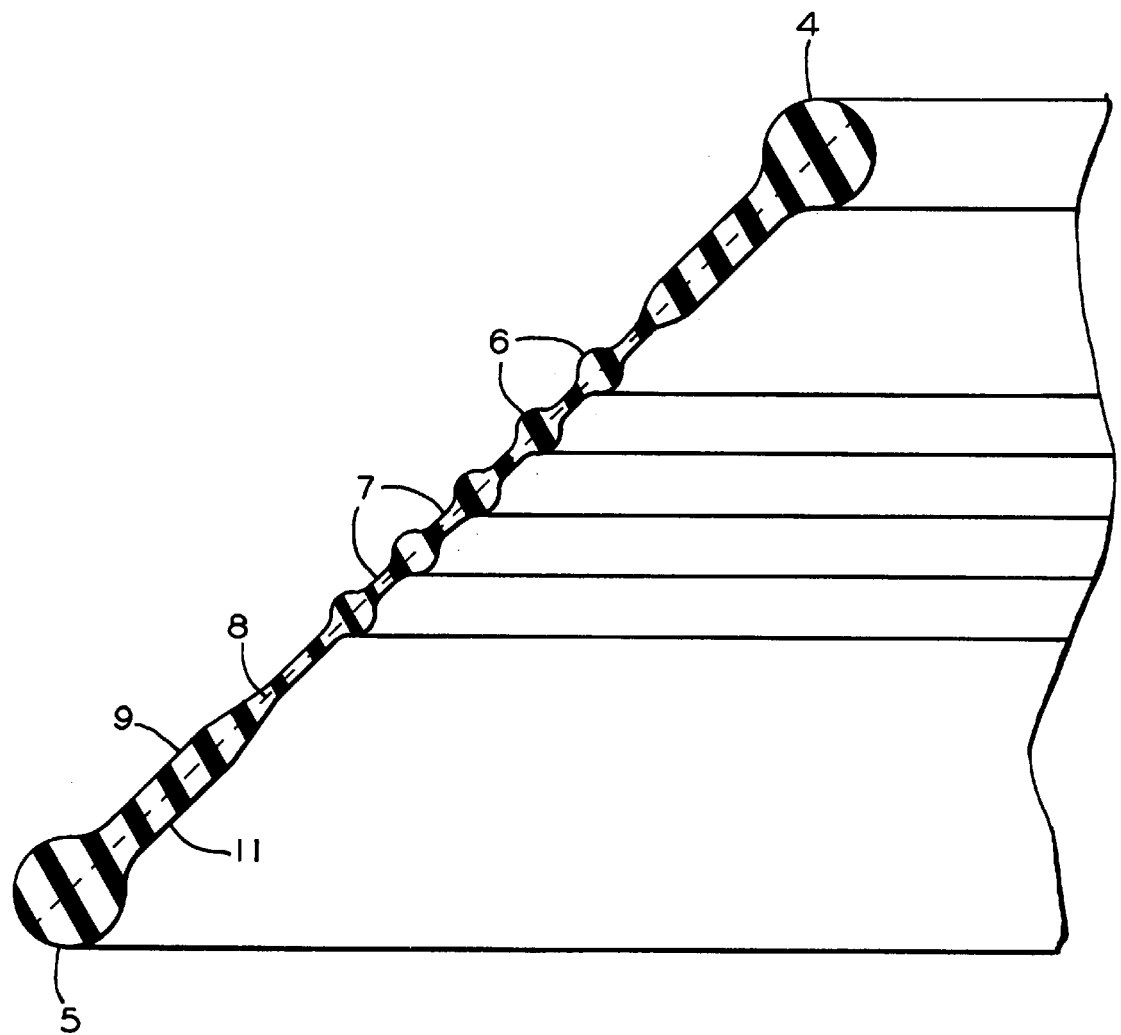
FIG. 3 is an enlarged cross-sectional view taken across a radial section of the diaphragm illustrated in FIG. 2.

Reference is now made, more particularly, to FIG. 3 which is an enlarged cross-sectional view taken across a radial section of FIG. 2. As is evident in FIG. 3, diaphragm 10 has a plurality of thick sections 6 and thin sections 7 along the flexure portion (the portion not secured at the ends) of such diaphragm 10. Such thick portions 6, having a fifth predetermined diameter, and thin portions 7 alternate along a working portion of such diaphragm 10. Further evident in FIG. 3 is a layer of fabric 8 between two layers of flexible material (elastomer) 9 and 11. The elastomer layers 9 and 11 may be the same or different materials. In a presently preferred embodiment of the invention such layers of elastomer 9 and 11 are the same. Further such elastomer is selected from a group comprising natural rubber, synthetic rubber, fabric reinforced elastomers and mixtures thereof. Also it is presently preferred that the elastomer in such diaphragm 10 be a synthetic rubber. Such fabric in such fabric reinforced elastomer is selected from a group including nylons, polyesters, cotton and Kevlar. Kevlar is the trade name of an aromatic polyamide (aramid) and is sold by E. I. DuPont de Nemours. In a presently preferred embodiment of the invention such fabric is nylon.

Further, as can be seen in FIG. 3, the alternating thick sections 6 are generally round and have a beadlike appearance. The configuration of the thick sections 6 may have a variety of shapes. However, in a presently preferred embodiment of the invention such alternating thick sections 6 are generally round and have a bead-like appearance. The bead-like appearance of such alternating thick sections 6 and thin sections 7 has been referred to as a "rosary bead profile".

The alternating thick and thin profile of diaphragm 10 provides diaphragm 10 with improved performance. The ability to produce thin cross-sections 7 while maintaining the strength with the thick sections 6 improves low temperature responsiveness and flex fatigue life of such diaphragm 10. Further the alternating thick sections 6 and thin sections 7 are more resistant to compression set wrinkles at the flexure points and provide a uniform response across the working length of diaphragm 10. In a presently preferred embodiment of the invention such thin sections 7 are generally less than half as thick as such alternating thick sections 6.

Figure 4:
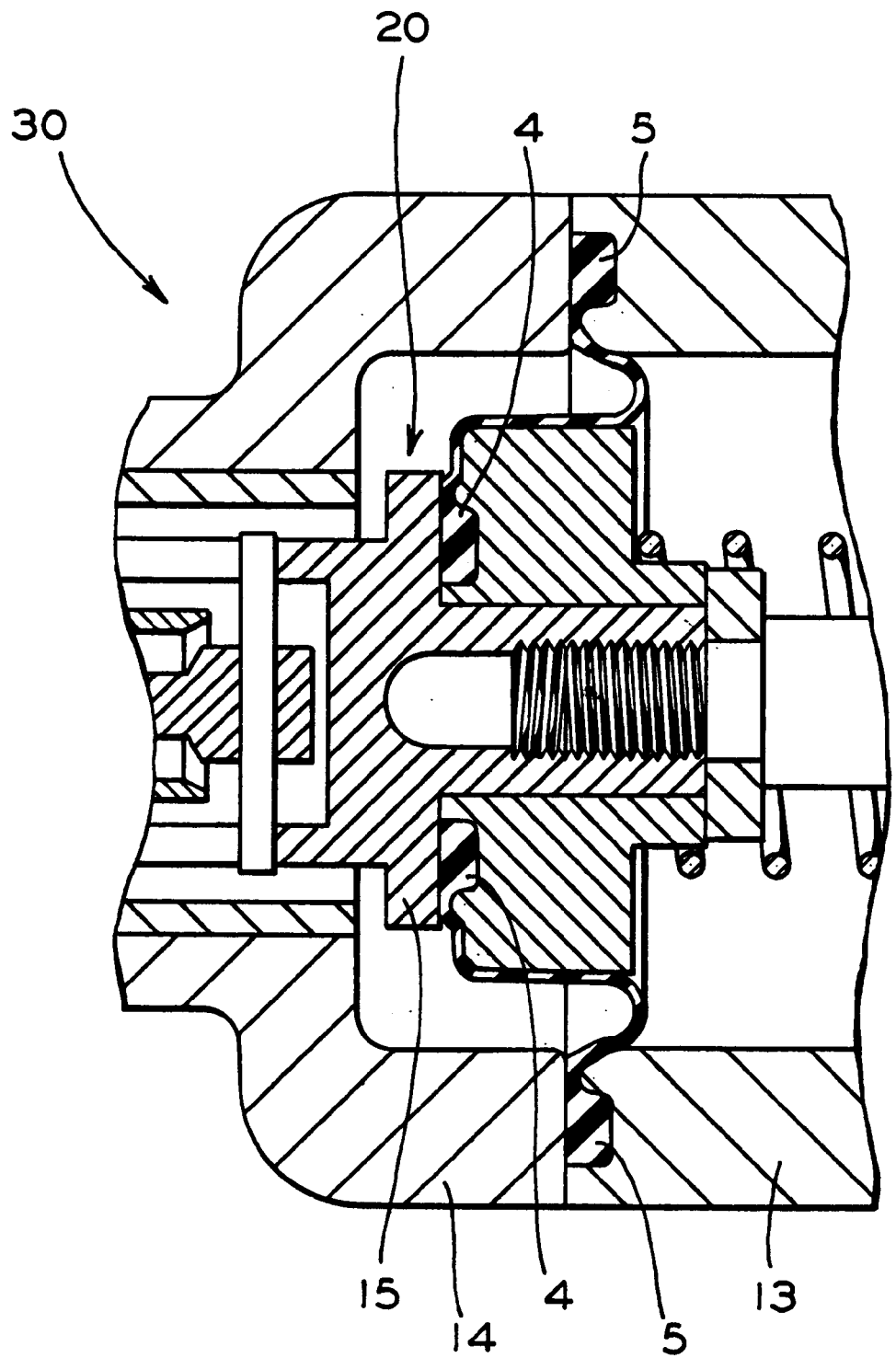
FIG. 4 is a cross-sectional view of a diaphragm actuated piston assembly of a load sensor of an empty/load control valve, used to illustrate a typical diaphragm actuating piston assembly.

Reference is now made to FIG. 4. Illustrated therein is a cross-sectional view of a diaphragm actuating piston assembly, generally designated 20, of a portion of an empty/load sensor valve, generally designated 30, of an empty/load brake control device. The present invention is applicable to all pneumatic diaphragms, however, the diaphragm actuating piston assembly 20 of an empty/load control valve is used to illustrate a typical diaphragm-piston assembly. In such typical diaphragm actuated piston assembly 20 such terminal bead-like portion 5 of diaphragm 10 is clamped between main body 13 and end body 14 of empty/load sensor valve 30, while inner terminal bead-like portion 4 is attached to piston body 15. The portion of the diaphragm between the attached inner terminal bead-like portion 4 and terminal bead-portion 5 is the flexure portion of the diaphragm which bears the stresses of constant flexing.

Figure 5B:
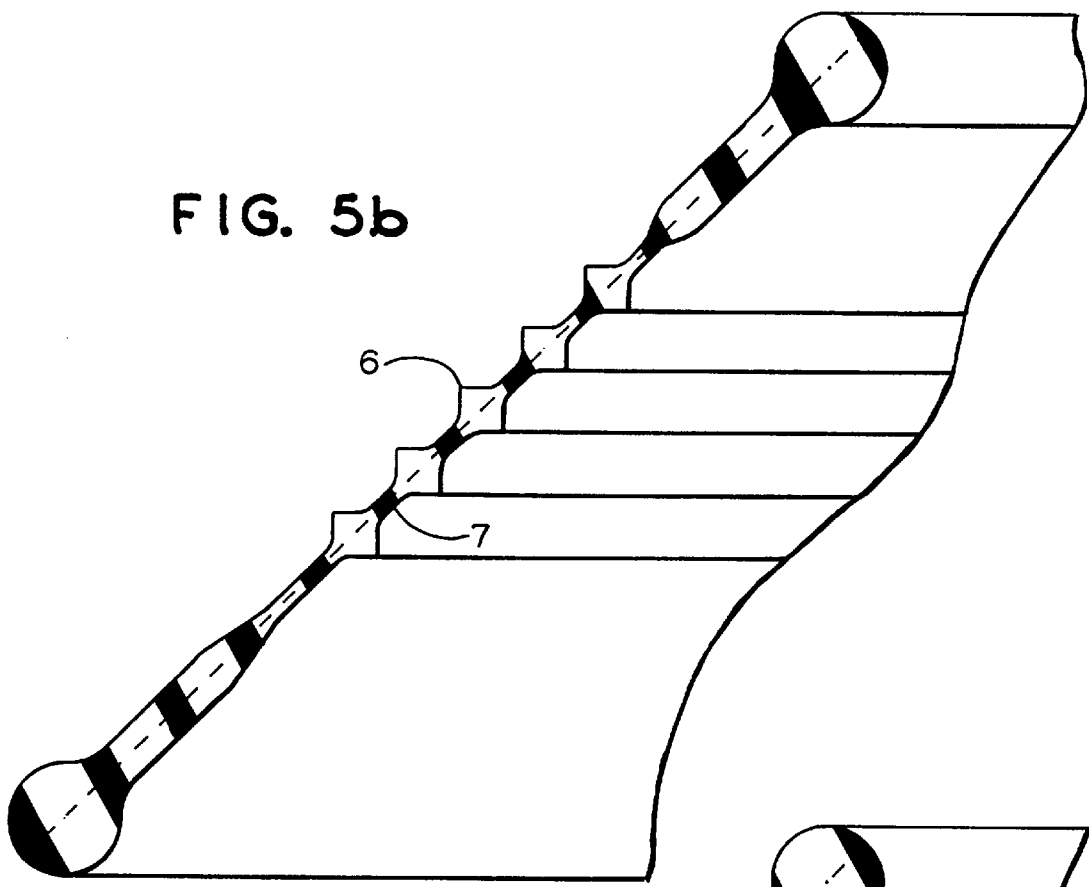
FIGS. 5a and 5b are enlarged cross-sectional views taken across a radial section of a diaphragm, similar to FIG. 3, showing alternate embodiments of the invention.
Figure 5A:
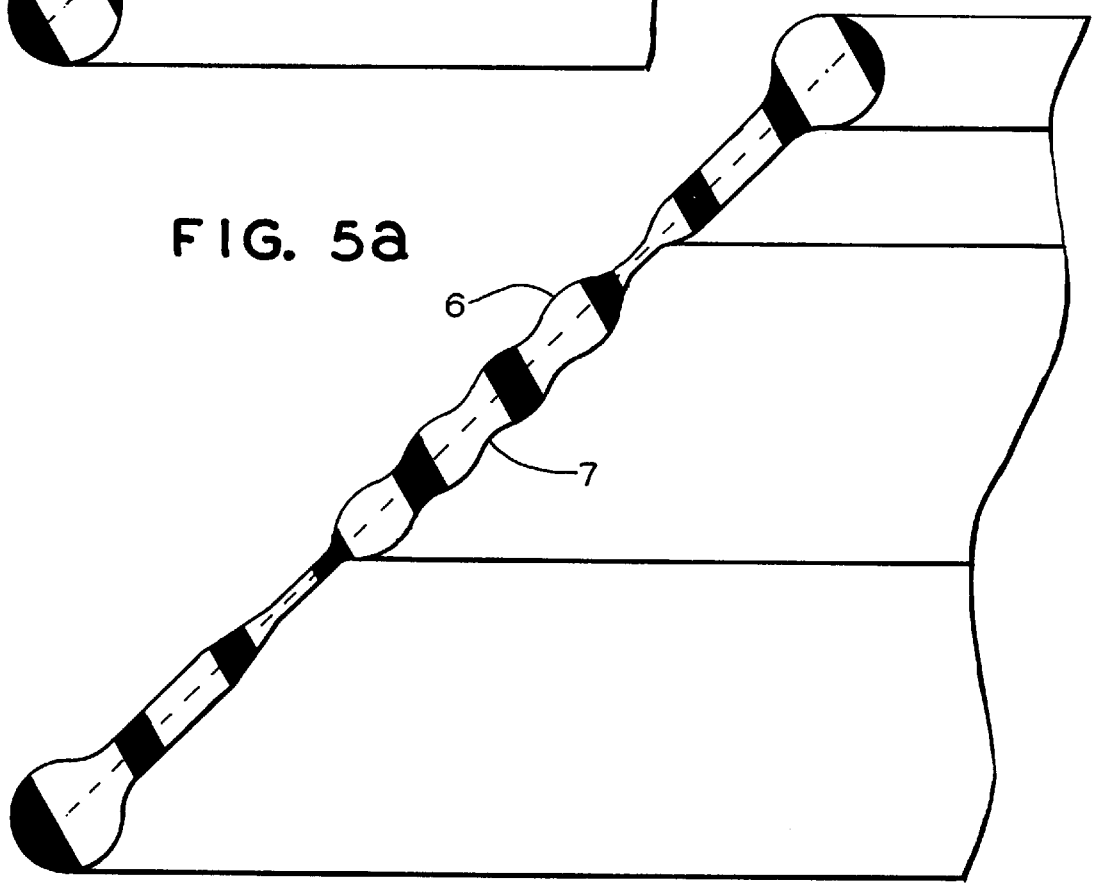

Reference is now made to FIGS. 5a and 5b. Illustrated therein are enlarged cross-sectional views taken across a radial section of the diaphragm, similar to that shown in FIG. 3, showing alternate embodiments of the invention. As stated previously, in the presently preferred embodiment of the invention such alternating thick sections 6 are generally round and have a beadlike appearance. However, as can be seen in FIG. 5a and 5b such alternating thick sections 6 can have configurations other than beadlike. The alternating thick sections may have a generally oblong shape or they could be a generally triangular-shaped projection on the sides of such generally flexure annular portion of such diaphragm.

The present invention as described above presents a truncated, conical diaphragm 10 wherein the design of such diaphragm 10 incorporates alternating thick sections 6 and thin sections 7 in the working or flexing portion of such diaphragm. Such a design can reduce fabric stress by reducing rubber velocity at the fabric interface during molding and can maintain the centering of the fabric in the cross-section of such diaphragm 10 better than diaphragms previously used.

While a presently preferred embodiment of the present invention has been described in detail above, it should be understood that various other adaptations and/or modifications of the invention can be made by those persons who are particularly skilled in the art related to diaphragms and more particularly to diaphragm-piston assemblies without departing from either the spirit of the invention or the scope of the appended claims.

We claim:

1. A diaphragm having a generally truncated conical body for use in diaphragm actuating piston assemblies, said diaphragm comprising:

(a) at least one layer of an elastomeric material selected from a group consisting of natural rubber, synthetic rubber, fabric reinforced rubber and various mixtures thereof;

(b) a first central opening, having a first predetermined diameter, disposed at a first edge of said diaphragm for mounting on a diaphragm actuating piston, said first central opening being formed by a bead-like portion having a second predetermined diameter;

(c) a second central opening, having a third predetermined diameter, disposed at a second edge of said diaphragm for mounting on a body portion of said diaphragm actuating piston assembly, said second central opening being formed by a bead-like portion having a fourth predetermined diameter; and (d) a generally flexure annular portion connected at a first end to said bead-like portion at said first central opening and at a second end to said bead-like portion at said second central opening, said generally flexure annular portion incorporating a predetermined plurality of annular thick portions and annular thin portions of said elastomeric material, a first projection of said plurality of annular thick portions being formed on a first side of said elastomeric material and a second projection of said plurality of annular thick portions being formed on a second side of said elastomeric material, said second projection being generally radially opposed to said first projection, said annular thick portions alternating with said annular thin portions throughout a working length of said diaphragm so as to provide a uniform response across said working length of said diaphragm and improve flex fatigue life of said diaphragm while maintaining strength with said thick portions.

2. A diaphragm having a generally truncated conical body for use in diaphragm actuating piston assemblies, according to claim 1, wherein said elastomeric material is fabric reinforced.

3. A diaphragm having a generally truncated conical body for use in diaphragm actuating piston assemblies, according to claim 2, wherein said fabric in said fabric-reinforced rubber is nylon.

4. A diaphragm having a generally truncated conical body for use in diaphragm actuating piston assemblies, according to claim 2, wherein said predetermined plurality of said annular thick portions of said elastomeric material are generally bead-like.

5. A diaphragm having a generally truncated conical body for use in diaphragm actuating piston assemblies, according to claim 4, wherein said generally bead-like annular thick portions of said elastomeric material a fifth predetermined diameter, said fifth predetermined diameter of said generally bead-like annular thick portions of said elastomeric material is less than said first predetermined diameter, said second predetermined diameter, said third predetermined diameter and said fourth predetermined diameter.

6. A diaphragm having a generally truncated conical body for use in diaphragm actuating piston assemblies, according to claim 5, wherein said predetermined plurality of alternating bead-like portions and annular thin portions of said elastomeric material throughout said working length of said diaphragm is five bead-like portions.

7. A diaphragm having a generally truncated conical body for use in diaphragm actuating piston assemblies, according to claim 1, wherein said fabric in said fabric-reinforced rubber is selected from nylons, polyesters, cotton and aromatic polyamides.

8. A diaphragm having a generally truncated conical body for use in diaphragm actuating piston assemblies, according to claim 7, wherein said fabric in said fabric-reinforced rubber is nylon.

9. A diaphragm having a generally truncated conical body for use in diaphragm actuating piston assemblies, according to claim 1, wherein said predetermined plurality of said annular thick portions of said elastomeric material are generally bead-like.

10. A diaphragm having a generally truncated conical body for use in diaphragm actuating piston assemblies, according to claim 6, wherein said generally bead-like annular thick portions of said elastomeric material have a fifth predetermined diameter.

11. A diaphragm having a generally truncated conical body for use in diaphragm actuating piston assemblies, according to claim 10, wherein said fifth predetermined diameter of said generally bead-like annular thick portions of said elastomeric material is less than said first predetermined diameter, said second predetermined diameter, said third predetermined diameter and said fourth predetermined diameter.

12. A diaphragm having a generally truncated conical body for use in diaphragm actuating piston assemblies, according to claim 10, wherein said fifth predetermined diameter of said annular thick portions of said elastomeric material generally are at least twice as thick as said annular thin portions that alternate with said annular thick portions throughout said working length of said diaphragm.

13. A diaphragm having a generally truncated conical body for use in diaphragm actuating piston assemblies, according to claim 1, wherein said predetermined plurality of alternating annular thick portions and annular thin portions of said elastomeric material throughout said working length of said diaphragm is at least three annular thick portions.

14. A diaphragm having a generally truncated conical body for use in diaphragm actuating piston assemblies, according to claim 13, wherein said predetermined plurality of alternating bead-like portions and annular thin portions of said elastomeric material throughout said working length of said diaphragm is five bead-like portions.

15. A diaphragm having a generally truncated conical body for use in diaphragm actuating piston assemblies, according to claim 1, wherein said second predetermined diameter of said bead-like portion at said first central opening and said fourth predetermined diameter of said bead-like portion at said second central opening are substantially identical.

16. A diaphragm having a generally truncated conical body for use in diaphragm actuating piston assemblies, according to claim 1, wherein said predetermined plurality of annular thick portions of said elastomeric material are generally oblong-shaped.

17. A diaphragm having a generally truncated conical body for use in diaphragm actuating piston assemblies, according to claim 16, wherein said alternating thin portions are disposed at adjacent ends of said generally oblong-shaped thick portions.

18. A diaphragm having a generally truncated conical body for use in diaphragm actuating piston assemblies, according to claim 1, wherein said predetermined plurality of annular thick portions are formed at least on said first side of said elastomeric material as generally triangular shaped projections.

19. A diaphragm having a generally truncated conical body for use in diaphragm actuating piston assemblies, said diaphragm comprising:

(a) at least one layer of an elastomeric material selected from a group consisting of natural rubber, synthetic rubber, fabric reinforced rubber and various mixtures thereof;

(b) a first central opening, having a first predetermined diameter, disposed at a first edge of said diaphragm for mounting on a diaphragm actuating piston, said first central opening being formed by a bead-like portion having a second predetermined diameter;

(c) a second central opening, having a third predetermined diameter, disposed at a second edge of said diaphragm for mounting on a body portion of said diaphragm actuating piston assembly, said second central opening being formed by a bead-like portion having a fourth predetermined diameter; and (d) a generally flexure annular portion connected at a first end to said bead-like portion at said first central opening and at a second end to said bead-like portion at said second central opening, said generally flexure annular portion incorporating a predetermined plurality of annular thick portions and annular thin portions of said elastomeric material, said predetermined plurality of annular thick portions being formed on a first side of said elastomeric material as generally triangular shaped projections and said predetermined plurality of annular thick portions being formed on a second side of said elastomeric material as generally triangular shaped projections, said generally triangular shaped projections on said first side are radially opposed to said generally triangular shaped projections on said second side of said elastomeric material.

* * * * *